United States Patent
Elmdahl et al.

(10) Patent No.: US 9,503,232 B2
(45) Date of Patent: Nov. 22, 2016

(54) METHODS AND APPARATUS FOR INTER-CELL INTERFERENCE COORDINATION WITH PROTECTED SUBFRAMES

(71) Applicant: Telefonaktiebolaget L M Ericsson (publ), Stockholm (SE)

(72) Inventors: Per Elmdahl, Linköping (SE); Angelo Centonza, Winchester (GB); Fredrik Gunnarsson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 158 days.

(21) Appl. No.: 14/383,850

(22) PCT Filed: Dec. 4, 2012

(86) PCT No.: PCT/SE2012/051344
§ 371 (c)(1),
(2) Date: Sep. 8, 2014

(87) PCT Pub. No.: WO2013/137795
PCT Pub. Date: Sep. 19, 2013

(65) Prior Publication Data
US 2015/0016387 A1  Jan. 15, 2015

Related U.S. Application Data

(60) Provisional application No. 61/611,625, filed on Mar. 16, 2012.

(51) Int. Cl.
*H04L 5/00* (2006.01)
*H04W 52/24* (2009.01)
(Continued)

(52) U.S. Cl.
CPC ............ *H04L 5/0032* (2013.01); *H04W 16/04* (2013.01); *H04W 52/0206* (2013.01);
(Continued)

(58) Field of Classification Search
None
See application file for complete search history.

(56) References Cited

U.S. PATENT DOCUMENTS

| 8,934,436 B2 * | 1/2015 | Dinan | H04W 72/12 370/328 |
| 2013/0107705 A1 * | 5/2013 | Dinan | H04W 72/0446 370/230 |

(Continued)

FOREIGN PATENT DOCUMENTS

WO  2011133081 A1  10/2011

OTHER PUBLICATIONS

Bhat, P. et al., "LTE-Advanced: An Operator Perspective", IEEE Communications Magazine, Feb. 2012, pp. 104-114.
(Continued)

*Primary Examiner* — Min Jung
(74) *Attorney, Agent, or Firm* — Murphy, Bilak & Homiller, PLLC

(57) ABSTRACT

A cellular radio communications network includes base stations that provide radio communication service to user equipments (UEs) in respective cell service areas. A node receives or determines a usage fraction or percentage of protected subframes and converts the fraction or percentage of protected subframes into one or more protected subframe patterns for an aggressor base station to not transmit on or to transmit at reduced power, in one example, an operations and maintenance (OaM) node configures one or more interfered base stations to use the one or more protected subframe patterns, in another example, the node is a base station.

41 Claims, 6 Drawing Sheets

(51) Int. Cl.
*H04W 52/02* (2009.01)
*H04W 16/04* (2009.01)
*H04W 72/04* (2009.01)
*H04W 72/12* (2009.01)
*H04W 28/06* (2009.01)
*H04W 52/14* (2009.01)
*H04W 24/02* (2009.01)

(52) U.S. Cl.
CPC ..... *H04W 52/0216* (2013.01); *H04W 52/244* (2013.01); *H04W 72/0446* (2013.01); *H04W 24/02* (2013.01); *H04W 28/065* (2013.01); *H04W 52/143* (2013.01); *H04W 72/12* (2013.01); *Y02B 60/50* (2013.01)

(56) References Cited

U.S. PATENT DOCUMENTS

2013/0107826 A1* 5/2013 Dinan ............... H04W 72/0446
370/329
2013/0107828 A1* 5/2013 Dinan ............... H04W 72/0446
370/329
2014/0254537 A1* 9/2014 Kim ..................... H04J 11/005
370/329

OTHER PUBLICATIONS

Lindbom, L. et al., "Enhanced Inter-Cell Interference Coordination for Heterogeneous Networks in LTE-Advanced: A Survey", Available online at: http://arxiv.org/ftp/arxiv/papers/1112/1112.1344.pdf, Dec. 7, 2011, pp. 1-18.

Unknown, Author, "Discussion on OAM Coordination for Macro-Femto Enhanced ICIC", 3GPP TSG-RAN WG3 Meeting #70, R3-103212, ETRI, Jacksonville, FL, USA, Nov. 15-19, 2010, pp. 1-4.

Unknown, Author, "Discussion on the Operational Carrier Selection", 3GPP TSG-RAN WG3 Meeting #74, R3-112765, Huawei, San Francisco, CA, USA, Nov. 14-18, 2011, pp. 1-2.

* cited by examiner

METHODS AND APPARATUS FOR INTER-CELL INTERFERENCE COORDINATION WITH PROTECTED SUBFRAMES

TECHNICAL FIELD

The technology relates to radio communications, and in particular, to inter-cell interference coordination (ICIC) in heterogeneous wireless networks (HetNets).

BACKGROUND

The technology in this application is described in an example Long Term Evolution (LTE) context. However, the technology can be applied to other types of networks and standards, e.g., GSM, uTRAN, etc. The architecture of the LTE system (sometimes called Evolved Universal Terrestrial Radio Access Network (E-UTRAN)) including logical interfaces between eNodeBs (eNBs) 10 (X2 interface) and between eNB 10 and Mobility Management Entity (MME)/Serving Gateway (S-GW) 12 (S1 interface) is shown in FIG. 1. LTE is based on a "flat" architecture compared to 2G and 3G systems. Each cell is associated to a frequency carrier, and is served by an eNodeB or eNB ("base station"). The E-UTRAN is made up of eNB nodes 10, which are connected to each other via the X2 interface. Both the S1 and the X2 interfaces can be divided into control plane (dashed lines) and user plane (solid lines) parts.

In addition to the user and control planes specified in 3GPP, there is an operation and management (OaM) architecture for network management to support configuration, equipment management, fault management, performance management etc. An example management system for 3GPP is shown in FIG. 2. The network elements (NE), also referred to as eNB 10, are managed by a domain manager (DM) 18, also referred to as the operation and support system (OSS). Sometimes the individual NEs, e.g., eNBs, are handled by an element manager (EM), which is a part of the DM 18. Typically, the DM 18, 20 manages only equipment from the same vendor. The DM tasks include configuration of the network elements, fault management, and performance monitoring. The latter task can require regular transfer of extensive data from events and counters from the network elements up to the DM 18. A DM may be managed by the network manager (NM) 16 via an interface called Itf-N. The NM 16 is also referred to as the Network Management System (NMS).

Two NEs 10 communicate over an X2 interface. The interface between two DMs 18 is referred to as Itf-P2P. Multi-vendor management can be handled either via the common NM and the interface Itf-N, or via the peer-to-peer interface Itf-P2P. Furthermore, the X2 interface between eNBs also supports some management, such as informing neighboring eNBs about served cells and their configurations. Because the X2 interface is standardized, eNBs from different vendors can readily communicate. Example information exchanged over X2 between peer eNBs includes served cell configuration information (carrier frequency, Cell Global ID, etc.), cell configuration for neighbor cells, signaling to request peer eNBs to modify mobility thresholds, and signaling to enable the activation of dormant cells (for energy saving) by a peer eNB.

Traditionally, a mobile network is deployed as a single service coverage layer, where the cell coverage areas are as mutually-exclusive as possible. In E-UTRAN (as well as in UTRAN), all cells can use the same carrier frequency. A heterogeneous wireless network (HetNet) augments the single layer network (sometimes referred to as the underlay layer or macro layer) with another overlay layer (sometimes referred to as a pico layer). The typical purpose of an overlay/pico layer is to provide extended capacity in a small area. This overlay/pico layer typically has for less coverage area than the underlay/macro layer because it uses cells with less power and lower-mounted antennas (maybe even mounted indoors). The cells of the overlay layer/pico can use the same carrier(s) as the underlay/macro layer cells.

The underlay/macro network is typically deployed with little overlap between macro cells so that UEs typically receive little interference in the downlink (DL) from other macro base stations. Also, on the uplink (UL), the UEs typically cause little interference to other macro cells. But in the HetNet scenario, the coverage area of a pico cell is typically completely covered by a macro cell. A UE attached to a pico cell is therefore interfered in the DL by DL transmissions from the macro cell. In the UL, UEs transmitting to the pico cell also interfere with the macro cell. This interference increases if Cell Range Extension is used. Cell Range Extension artificially increases a coverage area of a pico cell.

FIG. 3 shows a graphical representation of Cell Range Extension (CRE). With CRE, a handover trigger point between a Macro cell 22 served by a Macro base station 10M and a Pico cell 24 served by a Pico base station 10P changes so that a UE 26 connected to a Macro cell 22 hands over earlier to the Pico cell 24. Conversely, with this changed handover trigger point, a UE connected to a Pico cell hands over later to the Macro cell. A UE located in the CRE area between extended and nominal range/coverage shown in FIG. 3 is subjected to higher DL interference from the Macro cell 22 and generates higher UL interference to surrounding cells due to higher path loss to the Pico cell.

There are several approaches for mitigating the interference. Although a base station transmits some symbols (pilots, sync, system information, etc.) at full power, the transmission power level for other symbols used for control and data channels can be sent with reduced power or not sent at all during limited time periods. One such technique is Almost Blank Subframes (ABS) and another is Reduced Power SubFrames (RPSFs). Both techniques are examples of protected subframes. As shown in FIG. 4, the data channel transmit power, e.g., $P_{PDSCH}$, of the Macro base station in the macro cell is zero (on the left) or very low (in the middle) on certain subframes. A macro base station is either configured with an ABS power, which corresponds to blank the first two subframes as in the first graph on the left, or configured with RPSF, which corresponds to the first two subframes as in the middle graph.

An ABS pattern in LTE extends over M subframes and repeats so that subframe 1 has the same configuration as subframe M+1. In frequency division duplex (FDD) operation, M=40, and in time division duplex (TDD) operation, M=70. In other words, the ABS subframe pattern indicates which subframes among the M subframes are blanked, while the rest of the subframes are operated at full transmission power. The right-most graph in FIG. 4 shows how the pico base station behaves towards its pico cell edge UEs. If the pico base station is made aware about the ABS subframe pattern, via X2 signaling for example, the pico base station can schedule cell edge UEs to communicate during the blanked subframes, accordingly. In this example case, a cell edge UE is scheduled during the first two blanked subframes but not in the third, unprotected subframe. The pico base station may also consider scheduling some non-cell edge users in the third, unprotected subframe. The ABS pattern can be sent to other cells, like the pico cell in FIG. 4, which can use these ABSs to schedule UEs subject to high interference from surrounding cells, e.g., UEs in the cell range extension area. ABS are defined in 3GPP TS 36.331, incorporated herein by reference, which describes transfer of ABS patterns over the LTE X2 interface between eNBs as bit strings 40 bits long for frequency division duplex (FDD), and 70 bits for time division duplex (TDD). Each bit corresponds to one subframe (SF).

A second interference reduction approach uses Relative Narrowband Transmit Power (RNTP) signaling, which indicates whether the average transmitted power per physical resource block (PRB) in the frequency domain will be below a threshold—an RNTP threshold. A macro base station signals the RNTP PRB pattern to inform other cells about those PRBs having reduced DL interference. As with ABS pattern communication, a pico cell can schedule UE transmissions from the cell edge or UEs in the cell range extension area using lower power PRBs. This reduces UL interference in the macro cell.

In a third interference reduction approach, if a cellular network operator has several frequency carriers available, the operator can use one carrier for its Pico cells and another carrier for its Macro cells, and thereby avoid inducing interference from the macro cell to UEs served by the pico. But if the operator wants to use all or most of the carriers for its macro network, then it can be helpful to know to investigate to what extent the carrier reserved for the pico can be used also by the macro base station.

In the non-limiting example scenarios described below, the macro cell is the aggressor, and the victim UEs are served by the pico cell. This can be generalized to scenarios where a different cell type is the aggressor inducing excessive interference to a victim UE served by a different cell type. One such example is when the pico cell implements a restricted access to services, also referred to as closed access, which means that some UEs in the pico service area, but served by a macro cell, will be victim UEs while the pico cell is the aggressor.

There are a number of problems with these three approaches to inter-cell interference reduction. First, none of the approaches determines, which pattern of subframes should be blanked for ABS use and which RPSF subframe patterns to use low power on. ABS can be transmitted at zero or reduced power, which means that the RPSF pattern can be seen as an ABS pattern extended with reduced power level information. But it is not possible to configure the reduced power information in the existing 3GPP specifications. Second, even though 3GPP TS 36.300 specifies that the OaM takes that responsibility, there is currently no specification for the OaM to configure these ABS/RPFS patterns. Nor is there a way to ensure that the same ABS/RPFS pattern is used on different cells. But it would be desirable to ensure that the same pattern is used on different cells so that the Macro eNBs in a given neighbourhood allocate the same ABS pattern for its cells. The "protected" subframes in that pattern may then be used for highly interfered UEs to reduce interference. In other words, if a cell serves UEs that are interfered by more than one other cell, then with time-aligned ABS from these other cells, it is possible for the cell with the interfered UEs to schedule those UEs during subframes with less interference from other cells according to the ABS pattern. Third, there is no provision for an OaM to independently configure these patterns or to take feedback into account. The current 3GPP specifications mention reporting usefulness at an eNB of an ABS pattern from a neighboring eNB, but nothing is specified, either at the RAN level or at the OaM level. A fourth problem is that there is currently no way to determine or evaluate if a current configuration of ABS/RPSF is actually effective to meet interference reduction needs.

SUMMARY

In one or more example embodiments, an operations and maintenance (OaM) node is associated with a cellular radio communications network including base stations that provide radio communication service to user equipments (UEs) in respective cell service areas. The OaM node receives a usage fraction or percentage of protected subframes for an aggressor base station to not transmit on or to transmit at reduced power and converts the fraction or percentage of protected subframes for the aggressor base station into one or more protected subframe patterns. The OaM node configures one or more interfered base stations to use the one or more protected subframe patterns.

For example, the configuring includes indicating selected one or more protected subframes during which the aggressor base station transmission power for data channels or for data and control channels is at or near zero and indicating selected one or more other protected subframes during which the aggressor base station transmission power for data channels or for data and control channels is at a substantially reduced level to reduce inter-cell interference to permit the one or more interfered base stations to schedule downlink transmission during the one or more protected subframes.

Non-limiting examples of the one or more protected subframe patterns include an Almost Blank Subframes, ABS, pattern and/or a Reduced Power Subframes, RPSF, pattern, and wherein the ABS pattern may the same or different from the RPSF pattern. In this case, the configuring may include indicating that one or more ABS is a mandatory ABS and one or more ABS is an optional ABS and that one or more RPSF is a mandatory RPSF and one or more RPSF is an optional RPSF.

In an example implementation, the OaM node receives feedback information, and determines a number of protected subframes for configuring the one or more interfered base stations using the feedback information. The feedback information may include one or more of physical communication resource usage, uplink and/or downlink throughput in a cell, cell load, or interference information.

It may be desirable in some applications to determine if the protected subframe configuration meets a predetermined interference threshold and/or to perform the configuring only if one or more predetermined conditions are met.

In one example implementation, each protected subframe pattern is indicated as a bit map or a number of bit strings. The bit map or number of bit strings may be modified to satisfy one or more conditions such as a repetition rate for a retransmission protocol.

Multiple sets of protected subframe configuration data may be generated including: a first set of Almost Blank Subframes, ABS, pattern data and/or a Reduced Power Subframes, RPSF, pattern data, a second set including a percentage or fraction of communications resources to use for ABS and/or RPST, and a third set including a threshold on utilized ABS and/or RPSF.

In another embodiment, one or more interfered base stations may be configured with an overlay cell indicator or an underlay cell indicator useable by the one or more interfered base stations to determine whether to use the configured one or more protected subframes.

Another aspect relates to configuring protected subframes in a cellular radio communications network that includes base stations that provide radio communication service to user equipments (UEs) in respective cell service areas. A node receives or determines a usage fraction or percentage of protected subframes for an aggressor base station to not transmit on or to transmit at reduced power. The node converts the usage fraction or percentage of protected subframes into one or more protected subframe patterns for use by at least the aggressor base station to reduce inter-cell interference.

In example embodiments, the node is an operations and maintenance (OaM) node associated with the cellular radio communications network.

In other example embodiments, the node is the base station or other base station associated with the cellular radio communications network. In this case, the base station may decide to activate/use the determined one or more protected subframes based upon one or more conditions being met. An example condition is an indication that the aggressor base station may be causing interference to an interfered base station's cell. Indeed, the aggressor base station may determine not to use the one or more protected subframe patterns. Alternatively, the aggressor base station uses the one or more protected subframe patterns to schedule UE transmissions. In still further example implementations, the aggressor base station transmits information regarding the one or more protected subframe patterns to one or more other base stations to coordinate interference reduction.

In one example embodiment, the cellular radio communications network is a heterogeneous cellular radio communications network, the aggressor base station is a higher power macro base station, and the interfered base station is a lower power pico base station.

DESCRIPTION OF NON-LIMITING EXAMPLE EMBODIMENTS

Figure 1:
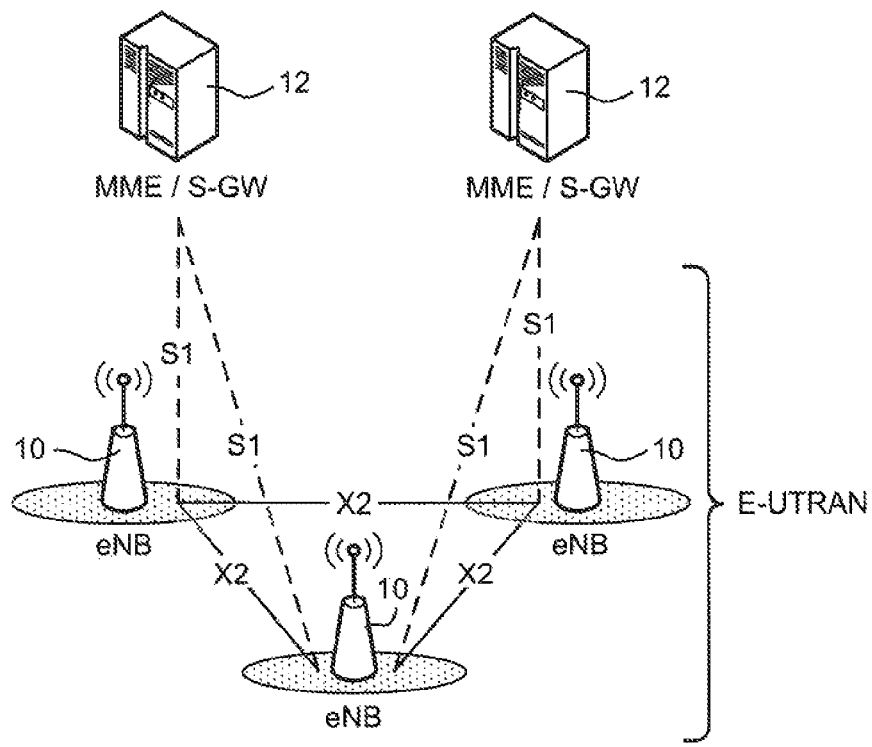
FIG. 1 shows a simplified version of an example LTE communications network.

The following sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for user equipment (UE), it should be understood by the skilled in the art that "UE" is a non-limiting term comprising any wireless device or node equipped with a radio interface allowing for at least one of: transmitting signals in UL and receiving and/or measuring signals in DL. Some examples of UE in its general sense are PDA, laptop, mobile, sensor, fixed relay, mobile relay, a radio network node (e.g., an LMU or a femto base station or a small base station using the terminal technology). A UE herein may comprise a UE (in its general sense) capable of operating or at least performing measurements in one or more frequencies, carrier frequencies, component carriers or frequency bands. It may be a "UE" operating in single- or multi-RAT or multi-standard mode, e.g., an example dual-mode UE may operate with any one or combination of WiFi and LTE.

A cell is associated with a base station, where a base station comprises in a general sense any node transmitting radio signals in the downlink (DL) and/or receiving radio signals in the uplink (UL). Some example base stations are eNodeB, eNB, Node B, macro/micro/pico radio base station, home eNodeB, relay, repeater, sensor, transmitting-only radio nodes or receiving-only radio nodes. A base station may operate or at least perform measurements in one or more frequencies, carrier frequencies, or frequency bands and may be capable of carrier aggregation. It may also be a single-radio access technology (RAT), multi-RAT, or multi-standard node, e.g., using the same or different base band modules for different RATs.

A subframe may be any time interval or time slot, which may be pre-defined. An example is an LTE subframe.

The signaling described is either via direct links or logical links (e.g. via higher layer protocols and/or via one or more network nodes). For example, signaling from a coordinating node may pass another network node, e.g., a radio node.

The example embodiments are not limited to LTE, but may apply to any Radio Access Network (RAN), single-RAT or multi-RAT. Some other RAT examples are LTE-Advanced, UMTS, GSM, cdma2000, WiMAX, and WiFi.

Embodiments described herein may be considered as independent embodiments or may be considered in any combination with each other to describe non-limiting examples. In the non-limiting examples below, an eNB is used as the example base station, a macro eNB as an example larger base station, and a pico eNB as an example smaller base station. A macro cell is used as a non-limiting example of an underlay layer and a pico cell is used as a non-limiting example of an overlay layer. But the technology applies more generally to any type or size of base station or cell. For example, the two base stations may be of the same or different size, power, type. etc. A protected subframe is a subframe that includes some protection from interference such as but not limited to inter-cell interference. Non-limiting examples of protected subframes include but are not limited to ABSs or RPSFs that where transmissions are "blanked" (no transmission) or use reduced transmission power during those subframes. Further, one or more protected subframes may be selected during which macro base station transmission power for data channels or for data and control channels is at or near zero. Another example includes one or more protected subframes during which macro base station transmission power for data channels or for data and control channels is at a substantially reduced level. These examples of protected subframes reduce inter-cell interference to permit the one or more pico base stations for example to schedule uplink transmission during the one or more protected subframes.

Figure 5A:
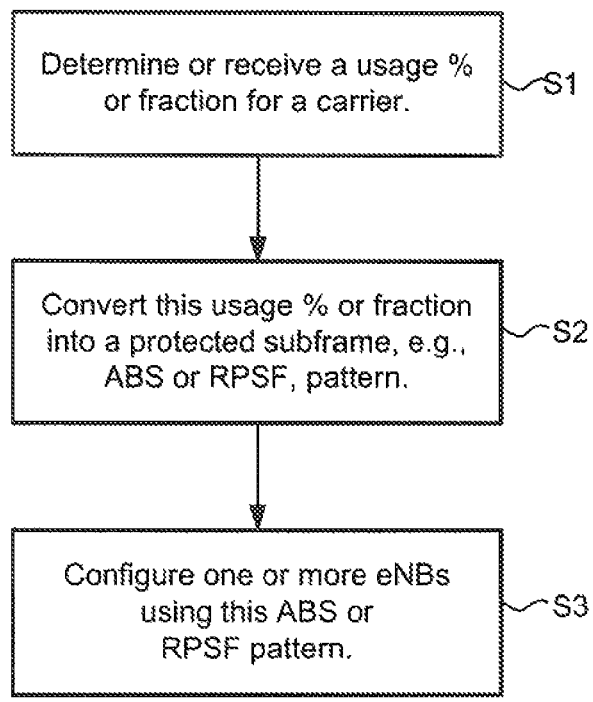
FIG. 5A is flowchart of non-limiting protected subframe procedures in accordance with a first example embodiment.

FIG. 5A is flowchart of non-limiting example protected subframe procedures that may be implemented by one or more nodes. The non-limiting example used in FIG. 5A is one or more OaM nodes, and to simplify the description, a single OaM node is assumed. But other types of nodes may perform the following functions. Instead of configuring protected subframe patterns directly, the OaM node receives (e.g., from an operator, base stations, or other sources) a usage fraction or percentage of the protected subframes, e.g., ABS or RPSF to blank or use low power on (step S1). The OaM node converts this fraction or percentage into one or more protected subframe patterns according to a computer-implemented algorithm, examples of which are provided below (step S2). In an "open loop" example embodiment, the algorithm calculates the configuration parameters based on operator inputs and one or more restrictions. In a "closed loop" example embodiment, the algorithm may also receive and take into account one or more feedback parameters in calculating the configuration parameters. The OaM node then configures one or more base stations, e.g., eNBs, to use the one or more protected subframe patterns (step S3). In one example embodiment, the protected subframe patterns are configured in an aggressor cell, i.e., a cell that is expected or understood to induce interference to a victim user.

Figure 5B:
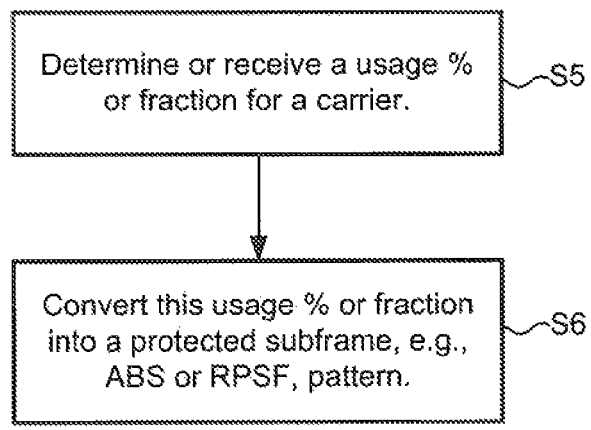
FIG. 5B is flowchart of non-limiting example protected subframe procedures in accordance with a second example embodiment.

FIG. 5B illustrates another example embodiment where a node receives or determines a protected subframe usage fraction or percentage for a base station to not transmit or to transmit at reduced power. The node converts the usage fraction or percentage of protected subframes into one or more protected subframe patterns for use by at least the base station to reduce inter-cell interference, e.g., according to a computer-implemented algorithm. Using the determined protected subframes may be activated based upon one or more conditions, e.g., an indication that the base station may be causing interference to a pico cell. In one example implementation, the node may be an OaM node. In another example implementation, the node may be a base station. Such a base station may, for example, determine not to use the protected subframes, and/or it may transmit information regarding the protected subframes to other base stations.

Figure 2:
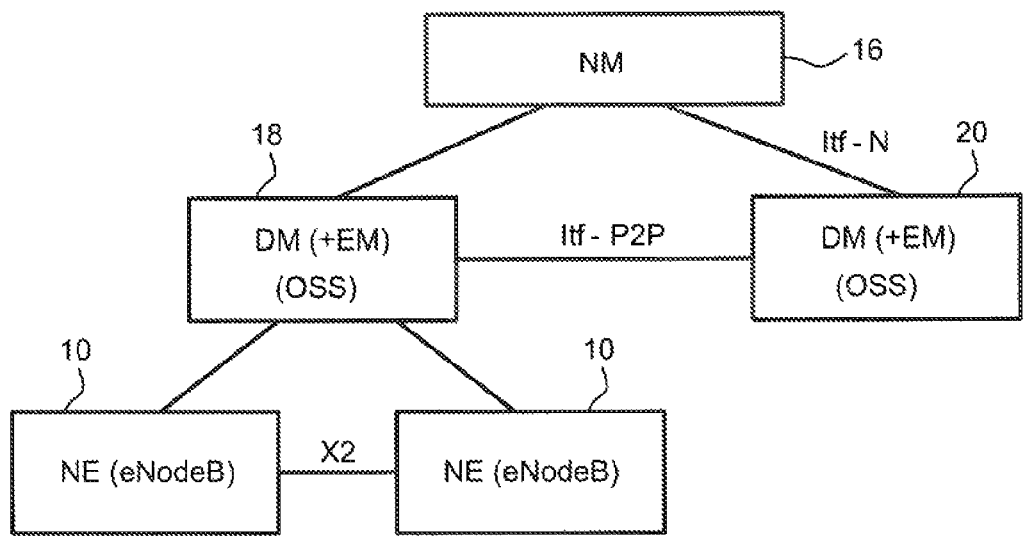
FIG. 2 shows an LTE example of an OaM system.
Figure 3:
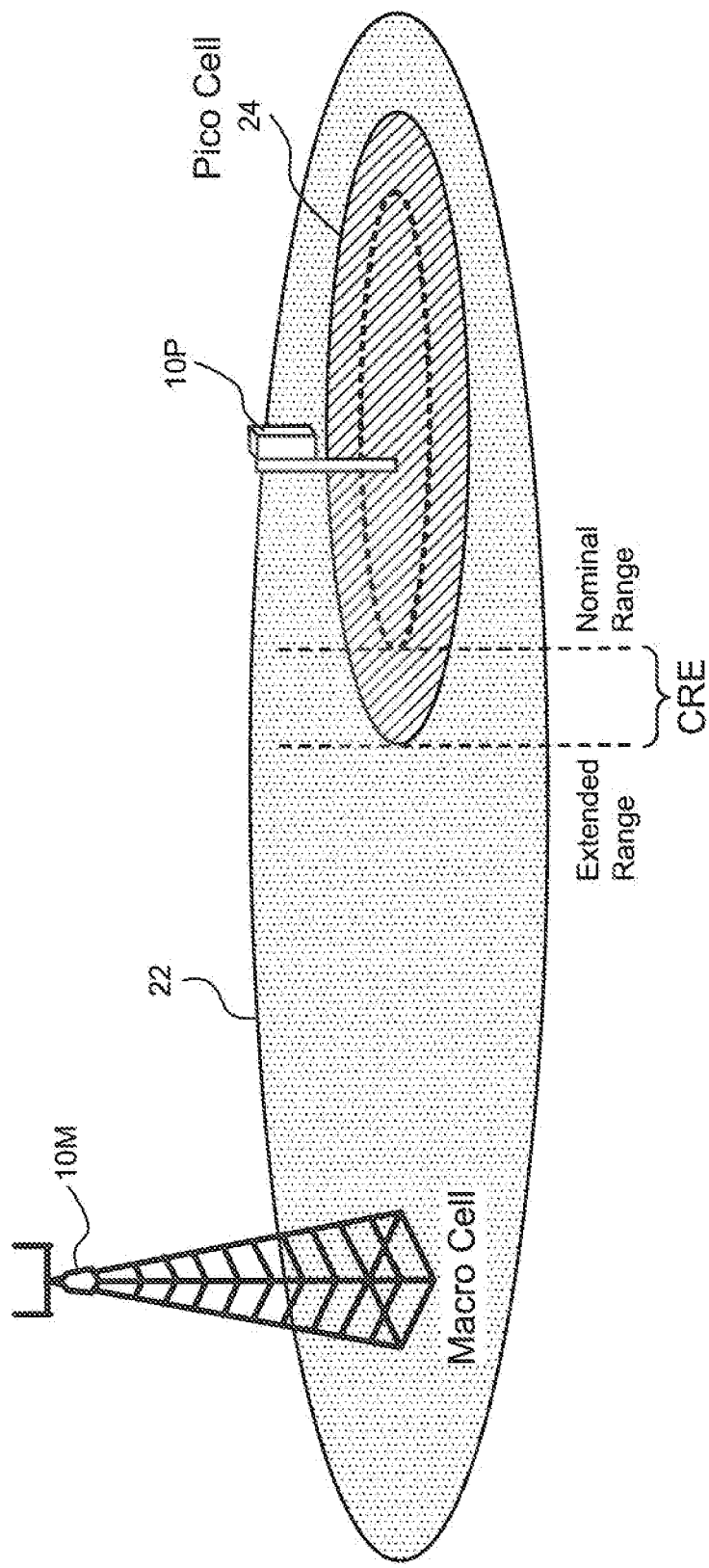
FIG. 3 shows an example of a CRE Area between a Macro cell and an unextended Pico cell.
Figure 4:
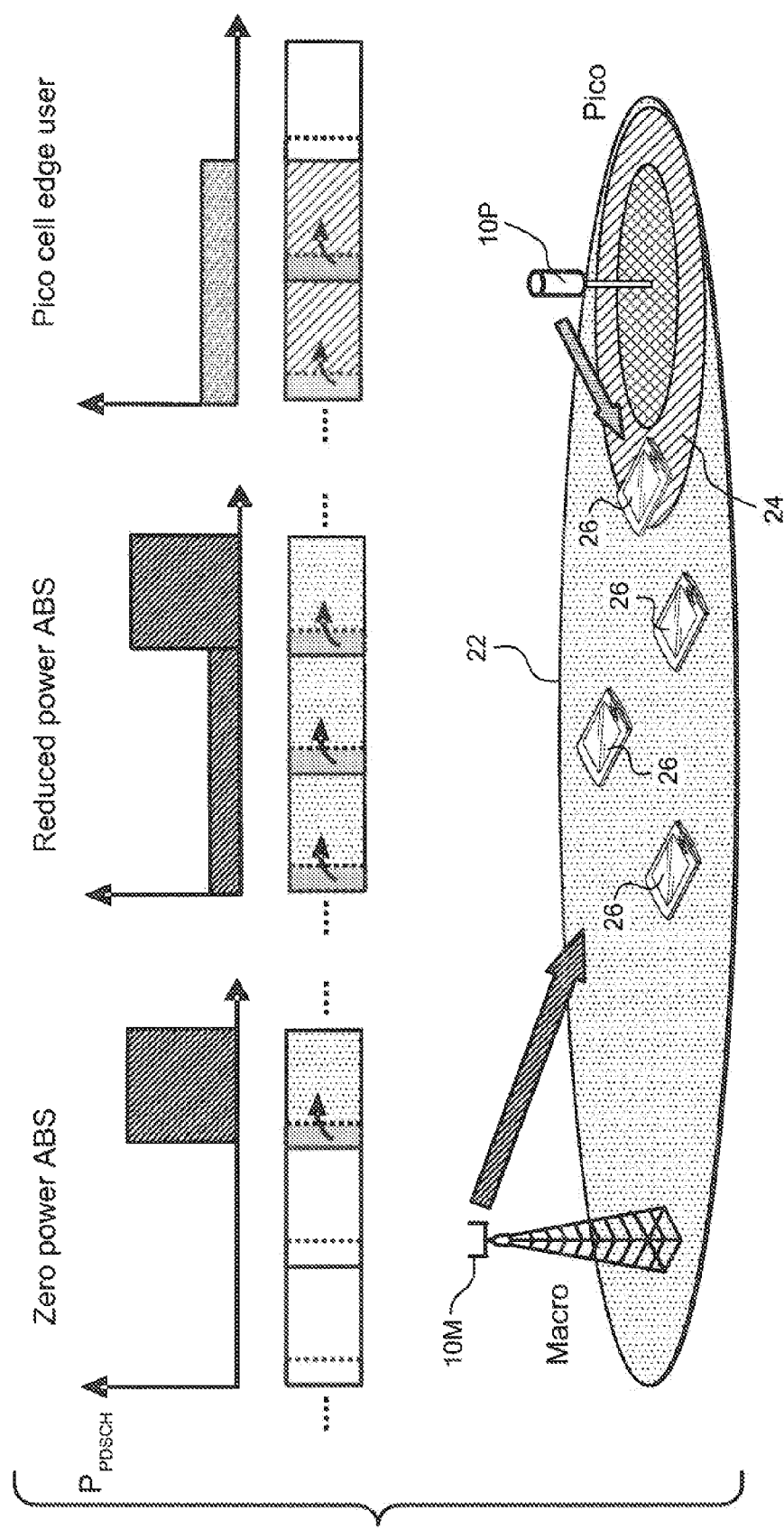
FIG. 4 shows example graphs of ABS, RPSF, and pico cell edge UE transmissions during the ABS/RPSF.
Figure 6:
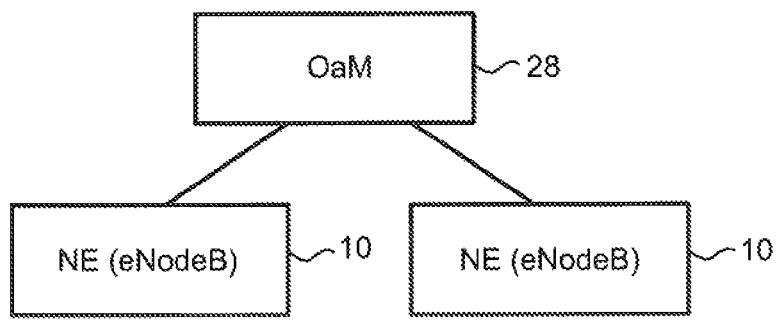
FIG. 6 is a function block diagram of a non-limiting example system that uses an OaM node.

FIG. 6 below shows a simplified function block diagram of an OaM node 28 communicating protected subframe pattern information to two representative network elements corresponding to eNBs 10. An OaM node 28 is shown in communication with two representative network elements (NEs) 10, examples of which include base stations like eNodeBs in LTE systems. The communication may be direct or indirect, wired or wireless link, optical link, or other. Another example implementation uses the LTE-based architecture illustrated in FIG. 2.

In one example embodiment, the OaM node provides to a Macro base station one or more protected subframe patterns, such as a subframe blanking and/or power reduction pattern, for a frequency carrier on a Macro cell managed by the Macro base station in order to provide a desired performance for the one or more Pico cells cell that overlays the Macro cell. One or more criteria may be used to measure performance at the Pico cell(s) such as: overall throughtput at Pico cell(s), signal quality for UEs at cell edge with the Macro cell, throughput for UEs at cell edge with the Macro cell, overall Primary Resource Block, PRB, utilization UEs at cell edge with the Macro cell, and/or interference levels for UEs at cell edge with the Macro cell.

In another example embodiment, the Macro base station does not need to use the ABS or RPSF patterns it receives from the OaM node. One reason for this might be that the Macro base station cell does not have a Pico base station cell neighbor. Another reason is that the Pico base station may not have indicated to the Macro base station that it wants interference protection. A pico base station may signal, in an LTE example, that it wants protection by using the X2: LOAD INFORMATION message with an invoke Indication IE set to "ABS Information," described in more detail below. Still another reason is that the Macro base station does not need to offload traffic to Pico cell neighbors because the Macro base station can handle the current traffic load in its macro cell.

An example embodiment may be implemented using program instructions executed by one or more computers in the Macro base station that initiates the ABS or RPSF patterns provided by the OaM node when conditions in the instructions are satisfied. Alternatively, similar conditions or rules can be implemented in an OaM node such that even though one or more protected subframe patterns are determined by a computer in the OaM node, the determined protected subframe patterns are only configured in the Macro base station when the condition(s) or rule(s) is/are triggered. In this latter case, the Macro base station preferably informs the OaM node about added neighbor cells, received "Invoke Indications" such as reception of an X2: LOAD INDICATION message from a victim cell that contains the Invoke Indication IE, indicating the need of protected resources allocation, offloading needs, etc. Moreover, the OaM may need to indicate to the Macro base station the type of Neighbor cell (Macro or Pico).

In another example embodiment, an OaM node configures a Macro base station frequency carrier with a desired protected usage fraction or percentage for that carrier for use by one or more Pico cells, For a Pico cell within the coverage area of a Macro cell, the OaM node configures the Pico base station to use that Macro cell frequency carrier.

In yet another example embodiment, a Macro base station may use several different frequency carriers in different macro cells with overlapping coverage. In this situation, a Pico cell uses one or several of these frequency carriers, and as a result, may be interfered differently from each carrier. In this case, the OAM system may configure the Macro base station with protected resource patterns accordingly, on each overlapping frequency carrier, in order to minimize interference at the Pico cell. Thus, the OaM configures a protected macro cell carrier and at the same time assigns the protected macro cell carrier to the pico cell. The Pico base station may be informed by the Macro base station about the implementation of the protected carrier, but the OaM does not need to inform the Pico base station about the patterns, etc. Rather, the OaM simply configures the carrier to be a protected carrier, and then the Macro base station may or may not inform the Pico base station about how the protection is implemented.

In yet another example embodiment, the conversion of a desired protection percentage or fraction amount into an ABS or RPSF subframe pattern involves finding the percentage or fraction of ABS SFs that is close to satisfying a desired macro usage percentage or fraction but does not exactly match the desired amount. This allows flexibility to determine the ABS or RPSF subframe pattern in a way that satisfies some further restrictions such as a repetition rate that meets one or more retransmission protocols. One example is HARQ retransmissions in LTE which have a periodicity of 8. For example, for a desired usage fraction of 90%, the actual percentage is 87.5% (1⅞) to accommodate an HARQ retransmission restriction with an 8 periodicity. Thus, the actual percentage can only be in terms of eights. The desired usage fraction may be processed to determine the closest lower possible actual percentage, in the example 87.5%.

In still another example embodiment, conversion of a desired usage fraction or percentage into an ABS or RPSF pattern considers RPSF as fractionally used. In other words, the ratio of power reduction may change depending on the subframe. For example, in the same RPSF pattern, one subframe has a 20% reduction and another 40%, and so on. The fractional usage is related to the RPSF power level, which means that a subframe with reduced power can have different power reduction levels. Subframes with 50% power may be considered a 50% fractional usage. Comparing to the embodiment above, a 87.5 fractional usage may be implemented as an ABS pattern with every $8^{th}$ subframe empty (zero power), or an RPSF pattern with every fourth subframe half empty/half power (or repetitive 8 subframe patterns with two out of the eight being empty). Alternatively, the 87.5 fractional usage may be implemented as an RPSF pattern with every $8^{th}$ subframe at reduced power (any reduction from full power is seen as a protected subframe) or as an RPSF pattern with two out of eight subframes at reduced power (any reduction from full power is seen as a half protected subframe). A subframe with 75% power reduction might be considered equivalent to two subframes with 50% power reduction. In general, the usage percentage of a subframe may be considered as a function of the subframe power level. These considerations of RPSF usage fraction can be taken into account when determining a RPSF pattern that meets the desired usage fraction.

In this next example embodiment, the fraction can be expressed in a number of ways. In a first example way, the fraction is a percentage. 0% means that none of the subframes are protected, and 100% means that all subframes are protected. Alternatively, 0% means that none of the subframes are available for full power use (all subframes use reduced/zero power), and 100% means that all of the subframes are available for full power use (none with reduced/zero power). A second example is to express the fraction to reflect a number of pattern bits, e.g., such as n/40, where $0 \le n \le 40$. This example corresponds to a bit String of 40 bits used in Information Elements (IEs) for conveying ABS patterns for LTE FDD over X2 (ABS Pattern Info IE). Another example expresses fractions as n/70, where $0 \le n \le 70$. This corresponds to a bit string of 70 bits that is used in information Elements for conveying ABS patterns LTE TDD over the X2 interface. A third example expresses the fraction expressed as n/8, where $0 \le n \le 8$, to account for an HARQ process having a period of 8 subframes. In a fourth example, the fraction is expressed as n/10, where $0 \le n \le 10$ to account for a radio frame that includes 10 subframes. More generally, the fraction can be expressed as n/m, where $0 \le n \le m$. Alternatively, the fraction can be expressed using more abstract terms, e.g., none, small, medium, large, full, where the definitions of these terms may be for example specified by a standard or through configuration by the OaM node.

In another embodiment, a network operator directly configures usage fractions as a complete configuration of a RPSF pattern, including a transmission power reduction, either the same for all subframes of the pattern, or different for different subframes. The pattern can be similar as the ABS patterns or different. There can be one or more patterns to configure the RPSF usage fractions. The power reduction can be in absolute terms or relative to the power of a reference signal. The reference signal can be the same for all UEs in a cell, or specific for one or more UEs.

Another example embodiment establishes mandatory and optional protected subframe patterns. The protected subframe patterns may either be configured to be mandatorily adopted by the configured cell, or they may be configured so that a certain number of subframes need to be always protected, while the remaining subframes can be protected depending on load conditions and traffic demand. These remaining subframes are examples of optionally protected subframes.

The protected subframe configuration may be an open loop type implementation where the OaM determines the configuration of ABS or RPSF patterns for a macro base station without feedback from the UE, base stations, or other nodes. But example embodiments also permit an OaM node to determine configuration of protected subframes, e.g., ABS or RPSF patterns, for a macro base station based on feedback information from one or more UEs, base stations, and/or other nodes. For example, an OaM node may receive from each ABS and/or RPSF configured base station feedback information regarding physical resource block (PRB) usage, total throughput in the UL and DL, and/or one or more other statistics indicating load in the cell. See also 3GPP TS 32.425, where performance measurements from eNBs to the OaM system are defined. Additionally, the OaM node may receive for example from base stations information contained in an ABS Status IE exchanged between base stations which specifies subframe patterns the base stations can use in a particular cell. In the case of RPSF, the ABS Status may either be interpreted as accounting for RPSF or a new IE indicating RPSF Status can be signalled to the OaM node. Depending on the feedback information, the OaM node may either increase or decrease the pool of ABS and/or RPSF each configured macro base station is to protect. As another option, the OaM node may reconfigure ABS or RPSF patterns between neighbor base stations so that the protected subframe patterns overlap as much as possible. Moreover, the feedback information may be filtered to include only information associated with UEs in a cell range extension region of a neighboring pico cell.

In yet another example embodiment, protected subframe patterns include patterns for multiple base stations in a given neighborhood. For example, the ABS configuration may become active in a configured Macro base station when the Macro base station receives an X2: LOAD INFORMATION message with an Invoke Indication IE set to "ABS Information" and if the Macro base station receiving the message is in condition to protect the configured subframes. The ABS configuration may include a bitmap indicating which subframe(s) should be protected, and this bitmap is preferably shared by multiple cells in the same neighborhood in order to coordinate and thereby increase the subframe protection in those neighboring cells. The bit map indicates the subframes that the macro base station should always protect in the cell if ABS is invoked and if it is feasible to protect those subframes. Optionally, the bit map may further include information or a further bit map may be provided indicating the ABS that should be protected only if the configured macro cell is in favorable load conditions. In another example embodiment, the protected subframe patterns include patterns of RPSFs to each cell in a given neighborhood. These RPSF patterns may be activated when a configured base station receives an X2: LOAD INFORMATION message with Invoke Indication IE set to "ABS Information" or when receiving an X2: LOAD INFORMATION message with an Invoke indication IE set to a new value for example called "RPSF Information." Potential example values for the Invoke Indication IE can be seen in the Table 1 below. This IE provides an indication about which type of information the sending eNB would like the receiving eNB to send back.

TABLE 1

| IE/Group Name | Presence | Range | IE type and reference | Semantics description |
|---|---|---|---|---|
| Invoke Indication | M | | ENUMERATED (ABS Information, RPSF Information, ABS and RPSF Information . . . ) | — |

The RPSF patterns configured for a cell may be sent to the base station invoking them via a new RPSF information IE included in the X2: LOAD INFORMATION message. A non-limiting example of how such new IE could be implemented is provided in Tables 2 and 3 below. Table 2 shows an example LOAD message sent by an eNB to neighboring eNBs to transfer load and interference coordination information (direction: $eNB_1 \rightarrow eNB_2$).

TABLE 2

Load Information

| IE/Group Name | Presence | Range | IE type and reference | Semantics description | Criticality | Assigned Criticality |
|---|---|---|---|---|---|---|
| Message Type | M | | 9.2.13 | | YES | ignore |
| Cell Information | M | | | | YES | ignore |
| >Cell Information Item | | 1 . . . <maxCellineNB> | | | EACH | ignore |
| >>Cell ID | M | | ECGI 9.2.14 | Id of the source cell | — | — |
| >>UL interference Overload Indication | O | | 9.2.17 | | — | — |
| >>UL High Interference Information | | 0 . . . <maxCellineNB> | | | — | — |
| >>>Target Cell ID | M | | ECGI 9.2.14 | Id of the cell for which the HII is meant | — | — |
| >>>UL High Interference Indication | M | | 9.2.18 | | — | — |
| >>Relative Narrowband Tx Power (RNTP) | O | | 9.2.19 | | — | — |
| >>ABS Information | O | | 9.2.54 | | YES | ignore |
| >>RPSF Information | O | | 9.2.x | | YES | ignore |
| >>Invoke Indication | O | | 9.2.55 | | YES | ignore |

Table 3 shows an example structure of the RPSF information IE. See in particular the RPSF pattern and the measurement subframe both for FDD and TDD.

TABLE 3

RPSF Information

| IE/Group Name | Presence Range | IE type and reference | Semantics description |
|---|---|---|---|
| CHOICE RPSF Information | M | — | — |
| >FDD | | — | — |
| >>RPSF Pattern Info | M | BIT STRING (SIZE(40)) | Each position in the bitmap represents a subframe, for which value "1" indicates 'protected in DL' and value "0" indicates 'not protected in DL'. The first position of the RPSF pattern corresponds to subframe 0 in a radio frame where SFN = 0. The RPSF pattern is continuously repeated in all radio frames. The maximum number of subframes is 40. |

TABLE 3-continued

RPSF Information

| IE/Group Name | Presence | Range | IE type and reference | Semantics description |
| --- | --- | --- | --- | --- |
| >>Number Of Cell-specific Antenna Ports | M | | ENUMERATED (1, 2, 4, . . .) | P (number of antenna ports for cell-specific reference signals) defined in TS 36.211 [10] |
| >>Measurement Subset | M | | BIT STRING (SIZE(40)) | Indicates a subset of the RPSF Pattern Info above, and is used to configure specific measurements towards the UE. |
| >TDD | | | — | |
| >>RPSF Pattern Info | M | | BIT STRING (1 . . . 70, . . . ) | Each position in the bitmap represents a subframe for which value "1" indicates 'protected in DL' and value "0" indicates 'not protected in DL'. The maximum number of subframes depends on UL/DL subframe configuration. The maximum number of subframes is 20 for UL/DL subframe configuration 1-5; 60 for UL/DL subframe configuration 6; 70 for UL/DL subframe configuration 0. UL/DL subframe configuration defined in TS 36.211 [10]. The first position of the RPSF pattern corresponds to subframe 0 in a radio frame where SFN = 0. The RPSF pattern is continuously repeated in all radio frames, and restarted each time SFN = 0. |
| >>Number Of Cell-specific Antenna Ports | M | | ENUMERATED (1, 2, 4, . . .) | P (number of antenna ports for cell-specific reference signals) defined in TS 36.211 [10] |
| >>Measurement Subset | M | | BIT STRING (1 . . . 70, . . . ) | Indicates a subset of the RPSF Pattern Info above, and is used to configure specific measurements towards the UE |

Alternatively, the RPSF patterns can be indicated in another example LTE embodiment to a base station via an existing Relative Narrowband Tx Power (RNTP) IE already present in the X2: LOAD INFORMATION message. For this purpose existing RNTP Threshold IE values can be used. Namely, when the RNTP threshold is below a certain value, the receiving base station may understand that the subframes with low emission power in the RNTP table are RPSF. As another alternative, a new RNTP Threshold IE value can be defined, for example equal to "RPSF threshold." This new value indicates that all the PRBs in the Relative Narrowband Tx Power (RNTP) IE bitmap with value set to one are RPSFs.

The level of transmission power adopted by a configured base station for RPSFs may depend on a number of factors. One example feedback factor is UE measurements on cell(s) invoking RPSFs such as RSRP or RSRQ measurements, which would give an estimation of the proximity of a cell to the configured base station. Another example factor is information received via the LTE X2 interface such as an UL interference indication received from an invoking eNB via X2: LOAD INFORMATION message. Yet another example factor is configuration information from a OaM node instructing each base station how many dBs to reduce power on the RPSFs.

A configuration of ABS or RPSF patterns does not necessarily need to be signalled to a base station. Instead, only the percentage or fraction of overall resources to be used as ABS and/or RPSF may be specified rather than an ABS and/or RPSF pattern.

In a further example embodiment, a base station is configured with both an ABS/RPSF resource percentage and an ABS/RPSF pattern. Selecting which to use may depend on the status of the neighbor cells using ABS/RPSF resources and whether they are in a position to exploit them efficiently. For example, the presence of a second Macro cell interfering with the Pico cell results in a need to coordinate protection front both Macro cells. The two Macro cells may therefore consider using the ABS/RPSF pattern aligned across different Macro cells to ensure that the interference protection for the Pico cell is aligned and co-located in time. The Macro cell may be made aware of the need for alignment by the Pico cell indicating the existence of a second interferer.

In another example embodiment, a cell is configured with three sets of data from OAM. The first set includes ABS and/or RPSF patterns as described above. The sets of data can be expanded or reduced depending on the granularity of the configuration. The second set includes a percentage of resources that should be used for ABS and/or for RPSF. Example names are ABS-ResPerc and RPSF-ResPerc. The third set includes a threshold on utilized ABS and RPSF subframes. Example names could be ABS-UtilThr and RPSF-UtilThr. The configured cell may start using ABS-ResPerc and/or RPSF-ResPerc either when asked to activate ABS/RPSF by a neighbor base station (via X2 signalling or via OAM configuration) or when deciding to activate ABS/RPSF autonomously. This means that the configured cell does not need to set specific subframes as ABS or RPSF, but only needs to ensure that the percentage of subframes indicated in ABS-ResPerc and/or RPSF-ResPerc is allocated as ABS or RPSF respectively. An advantage of this embodiment is that the configured base station is not limited in how it schedules traffic on available resources in its cells.

Figure 7:
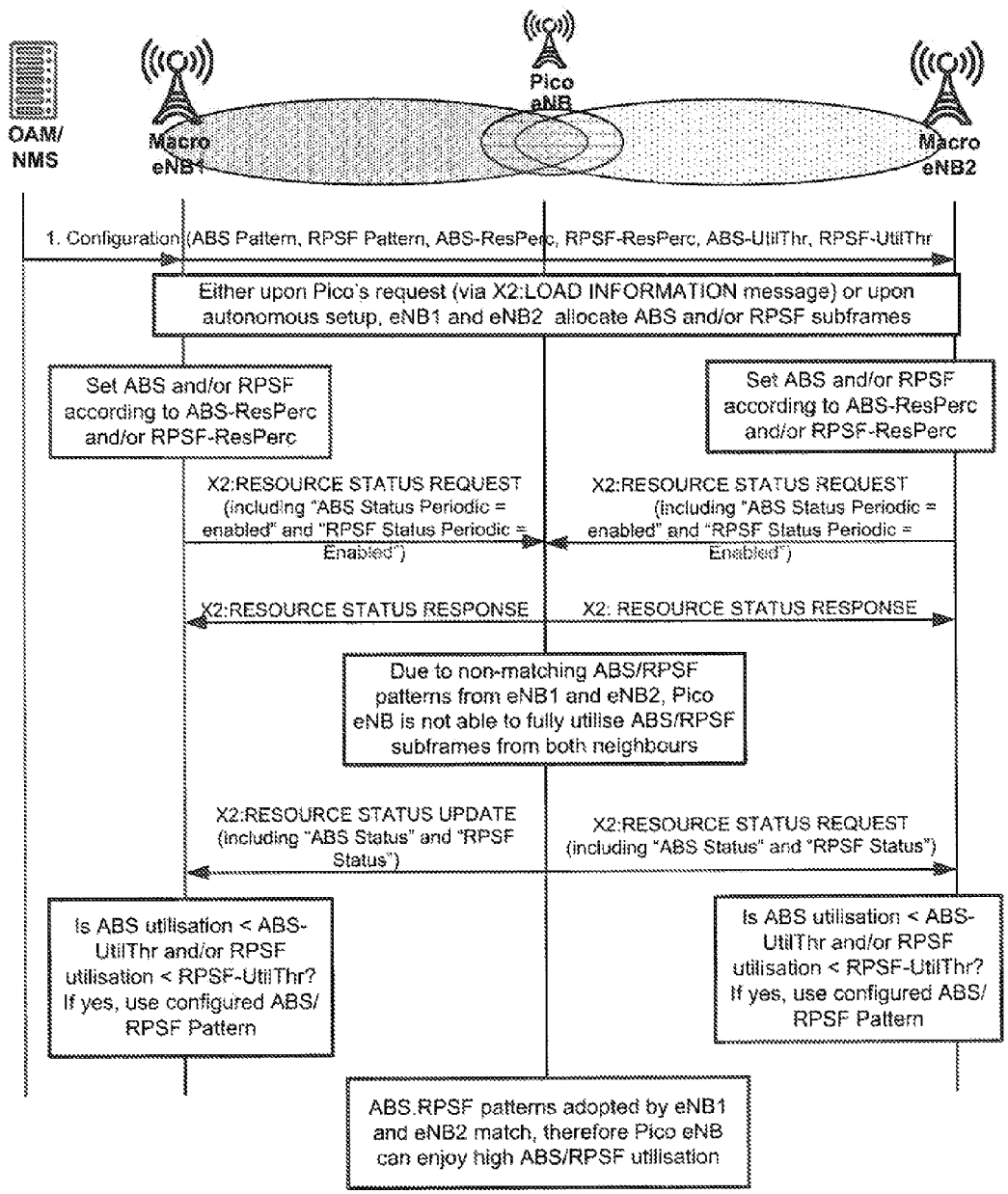
FIG. 7 is a signaling diagram showing an example OaM-initiated protected subframes configuration of macro and pico base stations.

A non-limiting example is shown in the signaling diagram of FIG. 7 which shows an example, OaM-initiated, protected subframes configuration of macro and pico base stations where ABS/RPSF percentage is used (see Set ABS an or RPSF according to ABS-ResPerc and/or RPSF-ResPerc for both Macro base stations in FIG. 7). After configuring ABS/RPSF, (see the configuration signals to both Macro base stations), each configured base station preferably starts a resource status report procedure for its cells towards neighbor base stations using ABS/RPSF to mitigate interference towards their served UEs. See the X2: RESOURCE STATUS REQUEST and X2: RESOURCE STATUS RESPONSE messages. The next function block indicates that due to non-matching ABS/RPSF patterns at both Macro base stations, the Pico eNB is not able to fully utilize ABS/RPSF subframes from both Macro cell neighbors and sends an X2: RESOURCE STATUS UPDATE to both Macro eNB1 and Macro eNB2. The Macro eNBs each receive the X2: RESOURCE STATUS UPDATE message which contain a DL ABS Status IE, which indicates what percentage of usable ABS subframes is used by the cells of the neighbor eNB, and an RPSF Status IE, structured like the ABS Status IE but refers to RPSF resources. A non-limiting example RPSF Status IE sent from eNB2 to eNB1, where eNB1 is the node configured with RPSF information from OAM/NMS, and eNB2 is the node using RPSF to mitigate interference to its served UEs is shown in Table 4.

After receiving the X2: RESOURCE STATUS UPDATE with ABS Status IE and/or RPSF Status IE each Macro eNB1 and Macro eNB2 evaluates whether the use of assigned ABS is below ABS-UtilThr and/or assigned RPSF is below RPSF-UtilThr. If the use is at or above both thresholds, then the Macro eNB1 and Macro eNB2 use the configured ABS/RPSF pattern. if the use is below one or both thresholds, then the neighbour cell is not able to use configured ABS and/or RPSF to efficiently mitigate interference on its served UEs. The most likely cause for this is that other neighbor cells are causing interference on such configured ABS and/or RPSF. Given the need to coordinate ABS and or RPSF patterns among neighbor cells, the configured Macro base station adopts the ABS/RPSF pattern previously configured by the OaM node, namely the Macro base station adopts the pattern provided by the OaM node, instead of a pattern internally configured on the basis of the scheduling needs of the Macro base station. Such patterns are configured either in part or in full on base stations for other neighbor cells, which adopt them if they can monitor an ABS/RPSF use lower than ABS-UtilThr and/or RPSF-UtilThr from their neighbor cells.

In the process of determining which pattern of protected resources for an OaM to configure Macro base stations, an

TABLE 4

Example of RPSF Status IE Structure

| IE/Group Name | Presence | Range | IE type and reference | Semantics description |
|---|---|---|---|---|
| DL RPSF status | M | | INTEGER (0 . . . 100) | Percentage of used RPSF resources. The numerator of the percentage calculation consists of resource blocks within the RPSF indicated in the Usable RPSF Pattern Info IE allocated by the $eNB_2$ for UEs needing protection by RPSF from inter-cell interference for DL scheduling, or allocated by the $eNB_2$ for other reasons (e.g. some control channels). The denominator of the percentage calculation is the total quantity of resource blocks within the RPSF indicated in the Usable RPSF Pattern Info IE. |
| CHOICE Usable RPSF Information | M | | — | — |
| >FDD | | | — | — |
| >>Usable RPSF Pattern Info | M | | BIT STRING (SIZE(40)) | Each position in the bitmap represents a subframe, for which value "1" indicates 'RPSF that has been designated as protected from inter-cell interference by the $eNB_1$, and available to serve this purpose for DL scheduling in the $eNB_2$' and value "0" is used for all other subframes. The pattern represented by the bitmap is a subset of, or the same as, the corresponding RPSF Pattern Info IE conveyed in the LOAD INFORMATION message from the $eNB_1$. |
| >TDD | | | — | — |
| >>Usable RPSF Pattern Info | M | | BIT STRING (1 . . . 70) | Each position in the bitmap represents a subframe, for which value "1" indicates 'RPSF that has been designated as protected from inter-cell interference by the $eNB_1$, and available to serve this purpose for DL scheduling in the $eNB_2$' and value "0" is used for all other subframes. The pattern represented by the bitmap is a subset of, or the same as, the corresponding RPSF Pattern Info IE conveyed in the LOAD INFORMATION message from the $eNB_1$. | algorithm for converting percentage/fraction to ABS/RPSF patterns may take into account one or more factors. A simple algorithm for example configures all Macro base stations with the same ratio/percentage to blank/reduce the power of the same subframes. A more elaborate algorithm may take several factors into account like neighbor cell relations, measurements from Macro base stations, etc.

A further example embodiment configures each cell in a given base station as overlay cell or underlay cell. This configuration indicates whether the cell is fully overlapped by another cell and therefore does not provide primary coverage, or whether the cell is providing primary coverage, for example in the case of coverage of an area where neighbor cell signals do not penetrate/interfere. This information may be used by the base station in determining whether to use ABS/RPSF. For example, given that a Pico cell is an underlay cell fully overlapped by the macro cell, the use of ABS subframes may be more appropriate given the likely proximity of the Pico cell to the Macro cell.

One example way to configure overlay/underlay relations utilizes a method for conveying coverage for Energy Savings (ES). In ES, a base station may be fully power on or powered down in order to reduce the amount of energy consumed during periods of relatively low traffic. A base station is may be powered down when it is fully overlapped by a neighbour cell, i.e., when powering down does not generate coverage holes. For ES, on the Itf-N interface, an attribute EUtranRelation.isESCoveredBy with a value range {no, partial, yes} is used. An attribute EUtranRelation.isHetNetCoveredBy may be created with the same value range. Alternatively, an existing isESCoveredBy attribute may be generalized, if both are not needed. This flag attribute may then be communicated, for example, through a Domain Manager (DM) (see FIG. 2) to the eNBs having both the overlay and the underlay cells. In this way, X2 communication between base stations regarding cell overlay/underlay relations is not needed. Alternatively, the overlay/underlay flag may only be sent to the overlay cell Macro nodes.

On the other hand, the overlay/underlay flag may be sent between neighbor eNBs via X2 signalling once the overlay/underlay flag is configured via an OaM node. One example implementation adds a new IE in an LTE Served Cells Information IE already present in the X2: SETUP REQUEST/RESPONSE message and in the X2: eNB CONFIGURATION UPDATE message. Further, the new IE may also be included for each cell in the list of cell under Neighbor Information IE contained in the X2: SETUP REQUEST/RESPONSE message and in the X2: eNB CONFIGURATION UPDATE message. The new information element may for example be named Cell Coverage Type IE or it may include an extended version of the existing Cell Type IE, where a new flag for example called Cell Coverage IE is added. The new information element, in any suitable form, may take the value of "overlay" or "underlay."

The knowledge of whether a neighbor cell is overlay or underlay is useful to an eNB in several ways. For example, frequent handovers of UEs served within a macro cell coverage should be avoided, or in the case if fast moving UEs the number of handovers should be minimized. The eNB may decide to avoid a handover to a neighbor cell if that cell is overlay when an underlay cell is providing coverage. An example is a UE is moving at high speed and reporting an overlay cell as a strong mobility candidate. The serving eNB might decide not to handover the UE to such cell if the cell is relatively small. This is possible because the target cell is an overlay, but there is still coverage for the UE on the underlay serving cell. On the other hand, the eNB may decide a handover to a neighbor cell is unavoidable in the example case where the cell is an underlay cell with no guaranteed coverage from any other cell. An example is an underlay target where it is not possible to avoid the handover without radio link failure. Such knowledge may be also used by an eNB to understand the level of subframe interference protection needed towards a neighbor cell. For example, if the neighbor cell is an underlay, it is typically valuable to ensure that it is protected. This may influence the decision on whether to allocate ABS or RPSF when an invoke message is received. For example, if the underlay cell is fully overlapped by the overlay cell and if its position is close to the overlay cell's base station, then allocation of ABS may be more appropriate given the higher interference protection on ABS subframes. On the other hand, if the underlay cell is close to the overlay cell edge. ABS and/or RPSF may be used.

Figure 8:
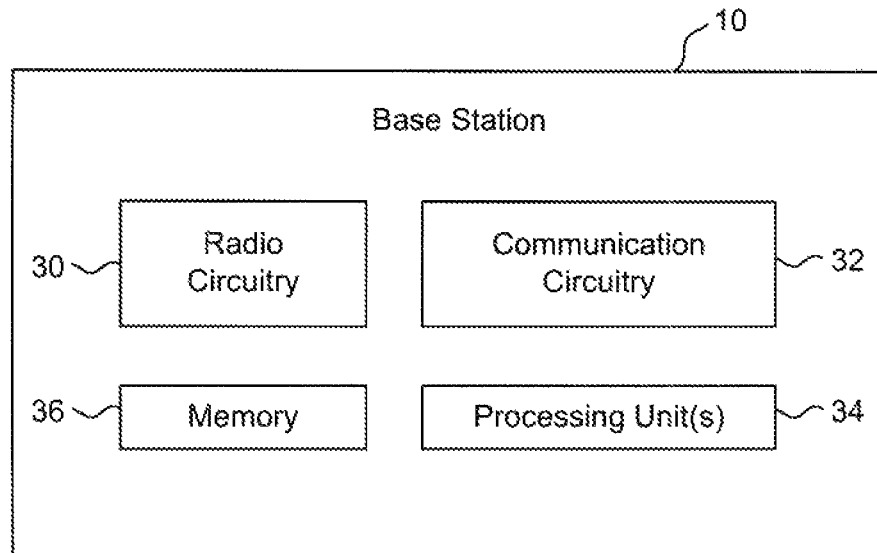
FIG. 8 shows a non-limiting example function block diagram for a base station such as a Pico eNB and a Macro eNB.

FIG. 8 shows a non-limiting example function block diagram of a base station 10—macro and/or pico—that may be used to implement the base station technology described above. The base station includes radio circuitry 30 to communicate over a radio interface with UEs and perhaps other nodes, e.g., relay nodes, communication circuitry 32 to communicate with other radio network nodes including other base stations and core network nodes such as an OaM node or an NMS, memory 36 to store information including data and program instructions, and one or more processing units 34 for implementing the base station tasks and steps described above, e.g., by executing program instructions retrieved from the memory 36. The radio circuitry 30 is configured to communicate with served UEs including configuring measurement reporting from such UEs so that UE measurement information along with statistical information gathered by the base station may be provided to the OaM node.

Figure 9:
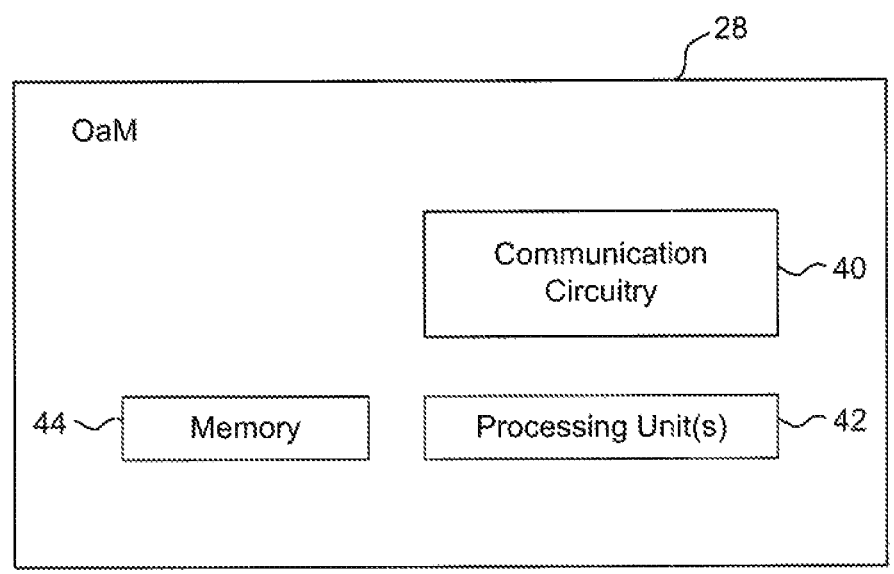
FIG. 9 shows a non-limiting example function block diagram for an OaM node.

FIG. 9 shows a non-limiting example function block diagram of an OaM node 28 that may be used to implement the OaM technology described above. The OaM node 28 includes communication circuitry 40 to communicate with other NMS nodes, if appropriate, a network operator, and with radio network nodes such as base stations, memory 44 to store information including data and program instructions, and one or more processing units 42 for implementing the OaM node tasks and steps described above, e.g., by executing program instructions retrieved from the memory 44.

The technology described above includes many advantages. For example, it provides the operator via an OaM node or other control node the ability to selectively configure protected subframes (e.g., ABS and RPSF) at a macro base station in an efficient manner. An operator does not need to configure protected subframe patterns (ABS and RPSF) for all network nodes, e.g., both Macro and Pico base stations, and instead can configure protected subframes for example only on Macro base stations. In addition, the operator may configure protected subframes generally, e.g., as a percentage or fraction, without having to specify for example explicit bit strings or maps. Existing signalling, e.g., X2 signalling (see 3GPP 36.423), may be used to transfer protected subframe information from Macro to Pico base stations if desired. Moreover, the option of configuring and using RPSF patterns relieves the operator from the constraint of limited subframe utilization in macro cells.

Although the description above contains many specifics, they should not be construed as limiting but as merely providing illustrations of some presently preferred embodiments. For example, non-limiting, example embodiments of the technology were described in an LTE context. But the principles of the technology described may also be applied to other radio access technologies. Indeed, the technology fully encompasses other embodiments which may become apparent to those skilled in the art. Reference to an element in the singular is not intended to mean "one and only one" unless explicitly so stated, but rather "one or more." None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims.

The invention claimed is:

1. A method for configuring protected subframes, the method being implemented by an operations and maintenance (OaM), node that is associated with a cellular radio communications network that includes base stations that provide radio communication service to user equipments (UEs), in respective cell service areas, the method comprising:
    receiving, from another node in the cellular radio communications network, a usage fraction or percentage of protected subframes for an aggressor base station to not transmit on, or for the aggressor base station to transmit on at reduced power;
    converting the usage fraction or percentage of protected subframes for the aggressor base station into one or more protected subframe patterns; and
    configuring one or more interfered base stations to use the one or more protected subframe patterns.

2. The method of claim 1, wherein configuring includes indicating selected one or more protected subframes during which an aggressor base station transmission power for at least one of data channels and control channels is at least one of zero, near zero and at a substantially reduced level to reduce intercell interference to permit the one or more interfered base stations to schedule downlink transmission during the one or more protected subframes.

3. The method of claim 1, wherein the one or more protected subframe patterns comprise at least one of an Almost Blank Subframes (ABS), pattern and a Reduced Power Subframes (RPSF) pattern, and wherein the ABS pattern is the same or different from the RPSF pattern.

4. The method of claim 3, wherein configuring includes indicating that one or more ABS is a mandatory ABS, one or more ABS is an optional ABS, one or more RPSF is a mandatory RPSF and one or more RPSF is an optional RPSF.

5. The method of claim 1, further comprising:
    receiving feedback information; and
    determining a number of protected subframes for configuring the one or more interfered base stations using the feedback information.

6. The method of claim 5, wherein the feedback information comprises at least one of physical communication resource usage, uplink and/or downlink throughput in a cell, cell load and interference information.

7. The method in claim 1, further comprising determining whether a protected subframe configuration meets a predetermined interference threshold.

8. The method of claim 1, wherein configuring includes configuring the one or more interfered base stations only if one or more predetermined conditions are met.

9. The method of claim 1, wherein each protected subframe pattern is indicated as a bit map or a number of bit strings.

10. The method of claim 9, further comprising modifying the bit map or number of bit strings to satisfy one or more conditions.

11. The method of claim 10, wherein the one or more conditions comprise a repetition rate for a retransmission protocol.

12. The method of claim 1, further comprising generating multiple sets of protected subframe configuration data comprising:
    a first set of at least one of Almost Blank Subframes (ABS) pattern data and Reduced Power Subframes (RPSF) pattern data,
    a second set comprising a percentage or fraction of communications resources to use for ABS and/or RPSF, and
    a third set comprising a threshold on utilized ABS and/or RPSF.

13. The method of claim 1, further comprising configuring the one or more interfered base stations with an overlay cell indicator or an underlay cell indicator useable by the one or more interfered base stations to determine whether to use the configured one or more subframes.

14. An operations and maintenance (OaM) node configured for operation in a cellular radio communications network that includes base stations that provide radio communication service to user equipments (UEs) in respective cell service areas, the OaM node comprising:
    a receiver configured to receive, from another node in the cellular radio communications network, a usage fraction or percentage of protected subframes;
    a data processor configured to convert the usage fraction or percentage of protected subframes into one or more protected subframe patterns for an aggressor base station to not transmit on, or for the aggressor base station to transmit on at reduced power; and
    a transmitter for transmitting information to configure one or more interfered base stations to use the one or more protected subframe patterns.

15. The OaM node of claim 14, wherein the transmitted information comprises an indication of selected one or more protected subframes during which an aggressor base station transmission power for at least one of data channels and control channels is at least one of zero, near zero and at a substantially reduced level to reduce intercell interference to permit the one or more interfered base stations to schedule downlink transmission during the one or more protected subframes.

16. The OaM node of claim 14, wherein the one or more protected subframe patterns comprise at least one of an Almost Blank Subframes (ABS) pattern and a Reduced Power Subframes (RPSF) pattern, and wherein the ABS pattern is the same or different from the RPSF pattern.

17. The OaM node of claim 14, wherein the transmitted information comprises an indication that one or more ABS is a mandatory ABS, one or more ABS is an optional ABS, one or more RPSF is a mandatory RPSF and one or more RPSF is an optional RPSF.

18. The OaM node of claim 14, wherein the receiver is configured to receive feedback information and the data processor is configured to determine a number of protected subframes for configuring the one or more interfered base stations using the feedback information.

19. The OaM node of claim 18, wherein the feedback information comprises at least one of physical communication resource usage, uplink and/or downlink throughput in a cell, cell load and interference information.

20. The OaM node of claim 14, wherein the data processor is configured to determine whether a protected subframe configuration meets a predetermined interference threshold.

21. The OaM node of claim 14, wherein the transmitter transmits the configuration information only if one or more predetermined conditions are met.

22. The OaM node of claim 14, wherein each protected subframe pattern is indicated as a bit map or a number of bit strings and the data processor is configured to modify the bit map or number of bit strings to satisfy one or more conditions.

23. The OaM node of claim 14, wherein the data processor is configured to generate multiple sets of protected subframe configuration data comprising:
   a first set of at least one of Almost Blank Subframes (ABS) pattern data and Reduced Power Subframes (RPSF) pattern data,
   a second set comprising a percentage or fraction of communications resources to use for ABS and/or RPSF, and
   a third set comprising a threshold on utilized ABS and/or RPSF.

24. The OaM node of claim 14, wherein the transmitted information includes an overlay cell indicator or an underlay cell indicator useable by the one or more interfered base stations to determine whether to use the configured one or more subframes.

25. A method for configuring protected subframes in a cellular radio communications network that includes base stations that provide radio communication service to user equipments (UEs) in respective cell service areas, the method performed by a node operating in the cellular radio communications network and comprising:
   determining at said node, or receiving from another node in the radio cellular communications network, a usage fraction or percentage for an aggressor base station to not transmit on, or for the aggressor base station to transmit on at reduced power; and
   converting the usage fraction or percentage of protected subframes into one or more protected subframe patterns for use by at least the aggressor base station to reduce intercell interference.

26. The method of claim 25, wherein the node is an operations and maintenance (OaM) node associated with the cellular radio communications network.

27. The method of claim 25, wherein the node is at least one of the aggressor base station and another base station associated with the cellular radio communications network.

28. The method of claim 27, further comprising activating the one or more protected subframe patterns based on one or more conditions.

29. The method of claim 28, wherein the one or more conditions are based on an indication that the aggressor base station may be causing interference to an interfered base station cell.

30. The method of claim 28, further comprising determining not to use the one or more protected subframe patterns.

31. The method of claim 28, further comprising using the one or more protected subframe patterns to schedule UE transmissions.

32. The method of claim 28, further comprising at least one of reducing and blanking downlink transmission power on one or more protected subframes in the pattern.

33. The method of claim 28, further comprising transmitting information regarding the one or more protected subframe patterns to one or more other base stations.

34. A node configured for operation in a cellular radio communications network that includes base stations that provide radio communication service to user equipments (UEs) in respective cell service areas, the node comprising one or more data processors configured to:
   determine, or receive from another node in the cellular radio communications network, a usage fraction or percentage for an aggressor base station to not transmit on, or for the aggressor base station to transmit on at reduced power; and
   convert the usage fraction or percentage of protected subframes into one or more protected subframe patterns for use by at least the aggressor base station to reduce intercell interference.

35. The node of claim 34, wherein the node is an operations and maintenance (OaM) node.

36. The node of claim 34, wherein the node is at least one of the aggressor base station and another base station associated with the cellular radio communications network.

37. The node of claim 34, wherein the one or more data processors are configured to activate the one or more protected subframe patterns based on one or more conditions.

38. The node of claim 34, wherein the one or more data processors are configured to determine not to use the one or more protected subframe patterns.

39. The node of claim 34, wherein the one or more data processors are configured to at least one of reduce and blank downlink transmission power on one or more protected subframes in the pattern.

40. The node of claim 34, wherein the one or more data processors are configured to generate information regarding the one or more protected subframe patterns for transmission to one or more other base stations.

41. The node of claim 34, wherein the cellular radio communications network comprises a heterogeneous cellular radio communications network, the aggressor base station comprises a higher power macro base station, and the interfered base station comprises a lower power pico base station.

* * * * *